United States Patent
Li

(10) Patent No.: US 8,165,388 B2
(45) Date of Patent: Apr. 24, 2012

(54) NEUTRAL PIXEL DETECTION IN AN IMAGE PATH

(75) Inventor: Xing Li, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 1085 days.

(21) Appl. No.: 12/042,370

(22) Filed: Mar. 5, 2008

(65) Prior Publication Data

US 2009/0226082 A1    Sep. 10, 2009

(51) Int. Cl.
| G06K 9/00 | (2006.01) |
| G06K 9/46 | (2006.01) |
| G06K 9/66 | (2006.01) |
| G06K 9/40 | (2006.01) |
| G06K 1/00 | (2006.01) |
| G06F 15/00 | (2006.01) |
| H04N 1/60 | (2006.01) |
| H04N 1/46 | (2006.01) |
| G03F 3/08 | (2006.01) |

(52) U.S. Cl. ........ 382/162; 382/165; 382/167; 382/190; 382/274; 358/1.9; 358/2.1; 358/518; 358/534

(58) Field of Classification Search .................. 382/162, 382/165, 167, 190, 274; 358/1.9, 2.1, 518, 358/534

See application file for complete search history.

(56) References Cited

U.S. PATENT DOCUMENTS

| 6,249,592 B1 * | 6/2001 | Fan et al. ...................... 382/112 |
| 6,590,676 B1 * | 7/2003 | Karidi ............................ 358/1.9 |
| 6,934,412 B2 * | 8/2005 | Bares ............................ 382/165 |
| 6,972,866 B1 * | 12/2005 | Bares et al. ..................... 358/1.9 |
| 7,116,443 B2 * | 10/2006 | Handley et al. ................. 358/1.9 |
| 7,200,263 B2 | 4/2007 | Curry et al. |
| 7,324,120 B2 | 1/2008 | Curry et al. |
| 2003/0206307 A1 * | 11/2003 | Handley et al. ................. 358/1.9 |
| 2004/0227758 A1 * | 11/2004 | Curry et al. .................... 345/426 |

* cited by examiner

*Primary Examiner* — Bernard Krasnic
(74) *Attorney, Agent, or Firm* — Philip E. Blair; Fleit Gibbons Gutman Bongini & Bianco P.L.

(57) ABSTRACT

A system and method for pixel and object level neutral detection. An image is scanned into a plurality of pixels. A local pixel of interest is identified along with a neighborhood of pixels around the local pixel. The chroma value of the current pixel as well as the average local chroma of the neighborhood are calculated. An adjusted chroma is determined based on the average local chroma. A luminance value can also be measured for the current pixel and for each of the neighbor pixels and a luminance variation determined. The adjusted chroma can be further modified based on the determined luminance variation. The adjusted chroma is compared against a threshold to determine a neutral pixel detection tag for the current pixel. The pixel tags can be utilized to control an adjustment of pixels in a device independent L*a*b* or a device independent CMYK domain.

21 Claims, 2 Drawing Sheets

NEUTRAL PIXEL DETECTION IN AN IMAGE PATH

TECHNICAL FIELD

The present invention is directed to systems and methods for neutral pixel detection in an image path of a xerographic, color scanning, or other multi-function color reproduction system.

BACKGROUND

It is important for image scanning and other document reproduction systems to be able to scan a document and accurately determine the color of each pixel of the scanned image. This is important for determining edge transitions. Edge detection is also important to research involving computer vision and feature extraction.

One goal of edge detection is to mark the points in an image at which the intensity changes sharply. A typical edge might be for instance a border between a block of red color and a block of yellow. Whereas, a line may be a small number of pixels of a different color on an otherwise unchanging background. There will be one edge on each side of the line.

Problems may also arise with false detection associated with color fringing. In optics, for example, chromatic aberration may be caused by a lens having a different refractive index for different wavelengths of light. The term "purple fringing" is used in the photographic arts. Longitudinal and lateral chromatic aberration of a lens is seen as "fringes" of color around the image, because each color in the optical spectrum cannot be focused at a single common point on the optical axis. Similar colored fringing around highlights may also be caused by lens flare. Colored fringing around highlights or dark regions may be due to the receptors for different colors having differing dynamic ranges or sensitivities.

In a color scanning and multifunction system, in order to achieve high output image quality it is often important have a good neutral pixel detection function in the image path. One of the challenges in neutral pixel detection is to differentiate pixels which are originally neutral but have some off-neutral chrominance values due to factors such as color space conversion error from low chroma color pixels such as the ones in highlight halftone regions. As with other image segmentation and analysis functions, neutral pixel detection has challenges related to improving robustness of neutral pixel detection such that the problem of missing or false detection is reduced.

Another challenge in neutral pixel detection is the need to deal with possible color mis-registration introduced in the scanning process. Mis-registration of RGB planes would cause otherwise neutral edges to have off-neutral values.

Accordingly, what is needed in this art are increasingly sophisticated methods for neutral pixel detection in an image path of a xerographic, color scanning, or other multi-function color reproduction system which reduce the aforementioned problems associated with pixel based neutral detection.

BRIEF SUMMARY

What is provided is a novel system and method for neutral pixel detection in an image path of a xerographic, color scanning, or other multi-function color reproduction system. The present method for neutral pixel detection utilizes a context window in L*a*b* space and generates neutral detection results. The neutral pixel detection tag generated by the present method can be utilized to control an adjustment of pixel values in a device independent L*a*b* domain or in a device independent CMYK domain. The neutral pixel detection tags of the present method can be further utilized to control processing at an object and page level.

In one example embodiment, an image is scanned to obtain a plurality of pixels and a current pixel of interest and a neighborhood of pixels around the current pixel of interest are identified. A chroma value for the current pixel and for each of the neighbor pixels is measure and an average local chroma is determined from the measured chroma values. An adjusted chroma is determined based on the average local chroma. A luminance value can also be measured for the current pixel and for each of the neighbor pixels and a luminance variation determined. The adjusted chroma can then be modified based on the determined luminance variation value. The adjusted chroma can be further modified based on a maximum and a minimum luminance value of the neighborhood. The adjusted chroma amount is compared against a predetermined threshold to determine a neutral pixel detection tag for the current pixel.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided is a system and method for neutral pixel detection in an image path of a xerographic, color scanning, or other multi-function color reproduction system.

It should be understood that one of ordinary skill in this art would be readily familiar with many facets of color science including chrominance and luminance detection and determination, and other techniques common to this art. Additionally, one of ordinary skill in this art would also be readily familiar with mathematical techniques used in the color science arts. One of ordinary skill in this art would also be knowledgeable about computer science and software and programming systems and methods sufficient to implement the functionality and capabilities described in detail herein in their own hardware environments without undue experimentation.

A Lab color space is a color-opponent space with dimension L* for luminance and a and b for the color-opponent dimensions, based on non-linearly compressed CIE XYZ color space coordinates. Lab is now more often used as an informal abbreviation for the CIE 1976 (L*a*b*) color space (also called CIELAB, whose coordinates are actually L*, a*, and b*).

Figure 1:
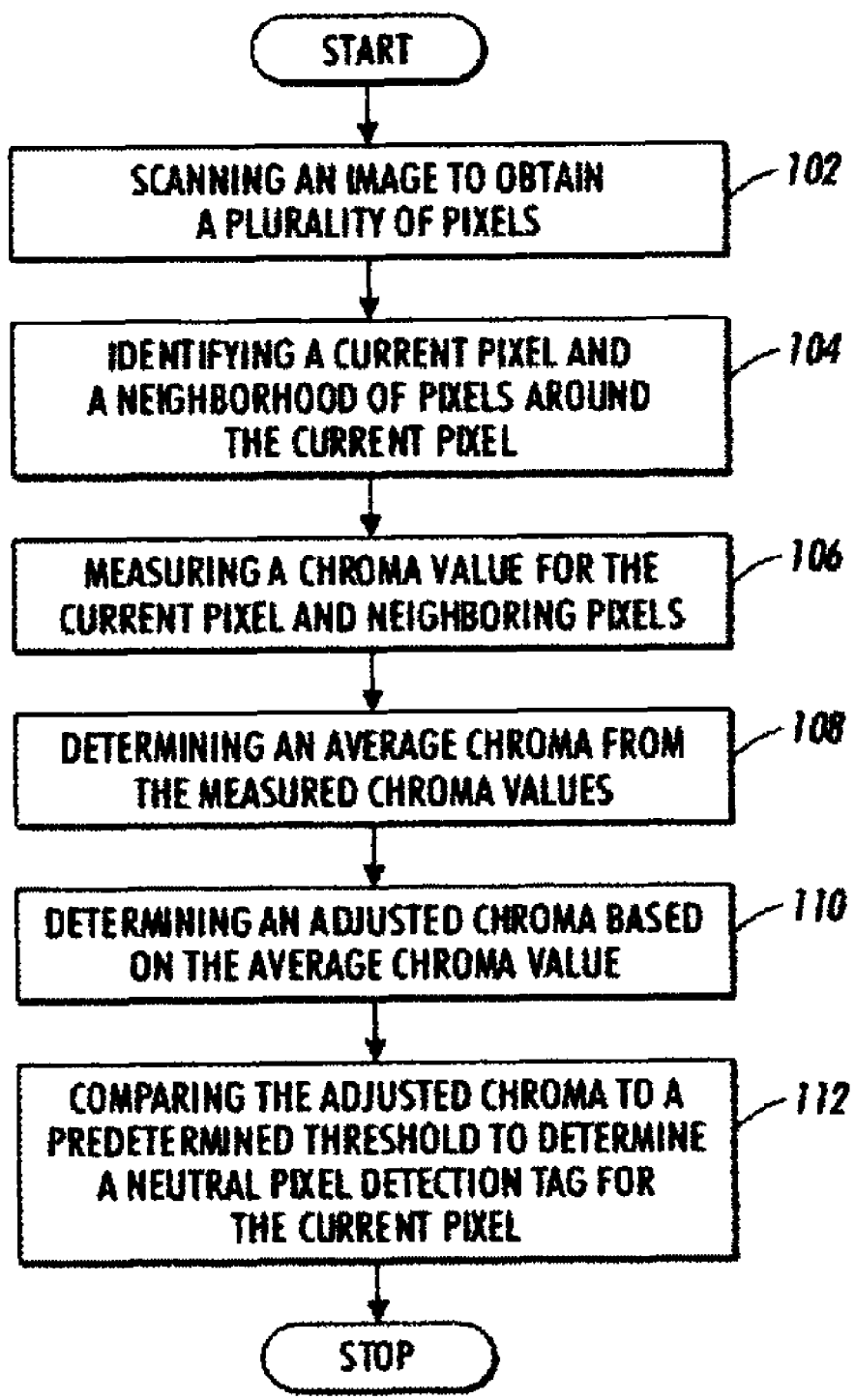
FIG. 1 is a flow diagram of one embodiment of the present method for neutral pixel detection in an image path.

Reference is now being made to FIG. 1 illustrating a flow diagram of one embodiment of the present method for neutral pixel detection.

In one example embodiment, at step 102, an image is scanned to obtain a plurality of pixels. At step 104, a current pixel of interest and a neighborhood of pixels around the current pixel of interest are identified. At step 106, a chroma value for the current pixel and for the neighboring pixels is measured. At step 108, an average local chroma is determined from the measured chroma values. At step 110, an adjusted chroma is determined based on the average local chroma. At step 112, the adjusted chroma amount is compared against a predetermined threshold to determine a neutral pixel detection tag for the current pixel.

In another embodiment, a luminance value is measured for the current pixel and for each of the neighbor pixels. A luminance variation is determined from the measured luminance values. The adjusted chroma is modified based on the determined luminance variation. The adjusted chroma can be further modified based on determined maximum and minimum luminance values.

The neutral pixel detection tag generated by the present method can be effectively utilized to control an adjustment of pixel values in a device independent L*a*b* domain or in a device independent CMYK domain. The neutral pixel detection tags of the present method can be further utilized to control processing at any an object and a page level.

It should be understood that the flow diagrams depicted herein are illustrative. Other operations, for example, may be added, modified, enhanced, condensed, integrated, or consolidated. Variations thereof are envisioned and are intended to fall within the scope of the appended claims.

More specifically, the present method for neutral pixel detection utilizes a small window of context in L*a*b* space.

Shown below is a context 5×3 window of a binary image in L*a*b* space in a 3 scanlines by 5 pixel detection window. The current pixel C is being examined and classified.

Figure 2:
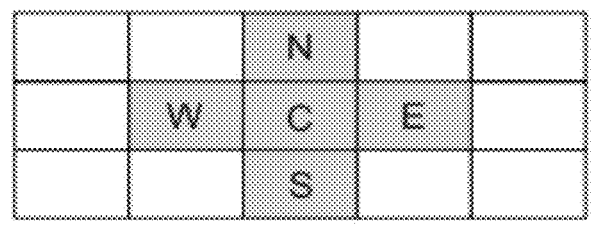
FIG. 2 shows a 5×3 window of pixels.

As shown in the 5×3 context window of FIG. 2, luminance and chrominance values from each of the five pixels (N, S, E, W, and C) in the 5×3 pixel window (15 pixels total) are determined according to the following method, where L, a*, and b* are color values determined from the three color planes, and offsetA and offsetB are programmable parameters.

The absolute values of the measured a* and b* color values minus a programmable offset (offsetA, offsetB) and, in one embodiment, are determined by the following relationship:

$$absA = |a\text{-offset}A|$$

$$absB = |b\text{-offset}B|$$

In one example, offsetA=128 and offsetB=128.

The chrominance (chroma) for each of the 5 identified pixels in the 5×3 window is based on the absolute value of the measured a* and b* color values (absA, absB) minus a predetermined offset. In one example, chromaZero=0.

In one embodiment, chrominance for each pixel is determined by:

$$chroma=\max((7*\max(absA, absB)+4*\min(absA, absB))>>3, \max(absA, absB))+chromaZero.$$

It should be understood that the mathematical notation notation ">>3" means shifted 3 bits to the right. Likewise, the notation "<<4" means shifted 4 bits to the left. One skilled in this art would understand a bit shift operation.

A minimum and maximum chrominance values, minC and maxC respectively, are based on the above-determined chroma for the 5 pixels. The chroma of the current pixel is used herein further.

An amount of variation in chrominance (deltaC) is based on the identified minimum chrominance (minC) and maximum chrominance (maxC) values. The chrominance variation is used to determine the average chroma adjustment discussed below. In one embodiment, the chrominance variation is determined by:

$$deltaC=maxC-minC.$$

An average chroma in the 5×3 pixel window is determined from the average a* and average b* of the window. In one embodiment, the average chroma of the 15 pixels in the 5×3 window can be approximated as:

$$avgC=(sumOf15<<4+sumOf15+128)>>8.$$

In another embodiment, the average chroma (avgC) is determined by:

$$avgC=\max((7*\max(|Avga\text{-offset}A|, |Avgb\text{-offset}B|)+ 4*\min(|Avga\text{-offset}A|, |Avgb\text{-offset}B|))>>3, \max(|Avga\text{-offset}A|, |Avgb\text{-offset}B|))+chromaZero.$$

The average chroma adjustment (avgC_adj) is based on an entry in a lookup table (LUT) containing chroma adjustment values indexed by the amount of chrominance variation (deltaC). In one embodiment, the average chroma adjustment is determined by:

--- if (deltaC > 7) then avgC_adj = 0;
else avgC_adj = Table1[deltaC].

---

The following lookup table (LUT) provides average chroma adjustment values having the format [S4.0] (signed 4 bit) for each variation in chrominance (deltaC).

TABLE 1

| Chroma Adjustment Values | |
|---|---|
| deltaC | avgC_Adj |
| 0 | 4 |
| 1 | 4 |
| 2 | 4 |
| 3 | 3 |
| 4 | 3 |
| 5 | 2 |
| 6 | 1 |
| 7 | 0 |

A minimum and maximum luminance, minL and maxL respectively, are measured for each of the 5 identified pixels in the 5×3 window.

An amount of luminance variation (deltaL) is based on the measured minimum luminance (minL) and maximum luminance (maxL) values. The luminance variation is used to determine an amount of chrominance adjustment. In one embodiment, the luminance variation is determined by:

$$deltaL=maxL-minL;$$

The amount of chrominance adjustment (currC_adj) is based on the luminance variation (deltaL) and programmable values. In one embodiment, the adjusted chrominance is determined by:

--- if (deltaL < e0) then currC_adj = currC_adj0;
else if (deltaL ≧ e0 AND deltaL < e1) then currC_adj = currC_adj1;
else if (deltaL ≧ e1 AND deltaL < e2) then currC_adj = currC_adj2;
else currC_adj = currC_adj3;

where e0, e1, e2 are programmable values of the format [U8.0] (unsigned 8 bit), and currC_adj0, currC_adj1, currC_adj2, and currC_adj3 are programmable values of the format [S5.0] (signed 5 bit). In one example, these programmable values are: e0=15, e1=40, e2=60, currC_adj0=0, currC_adj1=3, currC_13 adj2=4, currC_adj3=5.

The chroma adjusted luminance (chroma_adj_L) is based on an entry in a lookup table (LUT) containing minimum and maximum chroma adjustment values, as shown. In one embodiment, the chroma adjusted luminance is determined by the following relationship:

chroma_adj_*L*=chroma_adj_Min*L*_Table[min*L*/4]+ chroma_adj_Max*L*_Table[max*L*/4].

The chroma_adj_MinL_Table and chroma_adj_MaxL_Table are, in one example, tables of 64 entries of the format [U4] (unsigned 4 bit). In the example, the original luminance value ranges from 0 to 255, or has 256 levels. The luminance value is divided by 4 (or right shifted by 2 bits) to have the range of 0 to 63 (64 levels in total). Both the chroma_adj_MinL_Table and the chroma_adj_MaxL_Table have 64 entries. It is possible to keep all 256 levels or shift by other factors. In one embodiment, these tables have the following values:

| chroma_adj_MinL_Table |||||||||||||||| 
|---|---|---|---|---|---|---|---|---|---|---|---|---|---|---|---|
| 5 | 5 | 5 | 5 | 5 | 5 | 5 | 5 | 5 | 5 | 5 | 5 | 5 | 5 | 5 | 5 |
| 5 | 5 | 5 | 5 | 5 | 5 | 5 | 5 | 5 | 4 | 4 | 4 | 4 | 4 | 4 | 3 |
| 3 | 3 | 3 | 2 | 2 | 2 | 2 | 2 | 2 | 1 | 1 | 1 | 1 | 1 | 0 | 0 |
| 0 | 0 | 0 | 0 | 0 | 0 | 0 | 0 | 0 | 0 | 0 | 0 | 0 | 0 | 0 | 0 |

| chroma_adj_MaxL_Table |||||||||||||||| 
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 1 | 1 | 2 | 2 | 3 | 3 | 3 | 3 |

The new average chrominance (avgC_New) is based on the average chrominance (avgC), the average chroma adjustment (avgC_adj), and the chroma adjusted luminance (chroma_adj_L). In one embodiment, the new average chrominance is determined by:

avg*C*_New=max(0,(avg*C*-avg*C*_Adj-chroma_Adj_*L*));

The new chrominance of the current pixel (currC_New) is based on the minimum chrominance (minC), the chroma of the current pixel (currC), the adjusted chrominance of the current pixel (currC_Adj), and the chroma adjusted luminance (chroma_Adj_L). In one embodiment, the new chrominance of the current pixel is determined by:

curr*C*_New=max(0, (max(min*C*, (curr*C*-curr*C*_Adj))-chroma_Adj_*L*))

Once the new chrominance of the current pixel has been determined, the appropriate pixel neutral tag for the current pixel can then be determined.

The pixel neutral tag is based on the new average chrominance (avgC_New), the new chrominance of the current pixel (currC_New), and the maximum chrominance (maxC) value.

The following are example decision steps used to determine the appropriate pixel neutral tag for the current pixel. Note that pixC is a temporary variable. The variables c0, c1, and c2 are programmable values having the format [U5.0] (unsigned 5 bit). In one example, c0=4, c1=8, and c2=11.

In one embodiment, the pixel neutral tag is determined by the following:

```
pixC = min(currC_New, avgC_New);
if (pixC < c0) then pixNeutralTag = 3;
else if (pixC ≧ c0 AND pixC < c1) then pixNeutralTag = 2;
else if (pixC ≧ c1 AND pixC < c2) then pixNeutralTag = 1;
else pixNeutralTag = 0;
```

The values for the pixNeutralTags are provided as examples. Variations thereof are envisioned.

The above method is extendible to the entire window. In one embodiment, the window neutral tag is determined by the following:

```
winC = max(0, min(currC_New + currC_adj_Win,
    avgC_New + avgC_adj_Win));
if (winC < c0) then winNeutralTag = 3;
else if (winC >= c0 && winC < c1) then winNeutralTag = 2;
else if (winC >= c1 && winC < c2) then winNeutralTag = 1;
else winNeutralTag = 0;
```

In one example, currC_adj_Win=1.

The values for the winNeutralTags are provided as examples. Variations thereof are envisioned.

One skilled in this art would understand that the above determined pixel neutral and window neutral tags can be utilized to control, for example, the adjustment of pixel values in device independent domains such as CIEL*a*b*, or in device independent domains such as CMYK, or both, depending on their own environments and objectives. It should also be understood that these can be used to control object or page level processing as well. Other uses hereof are envisioned and are intended to fall within the scope of the appended claims.

One skilled in this art would readily be able to implement the above-described determinations into on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like.

Figure 3:
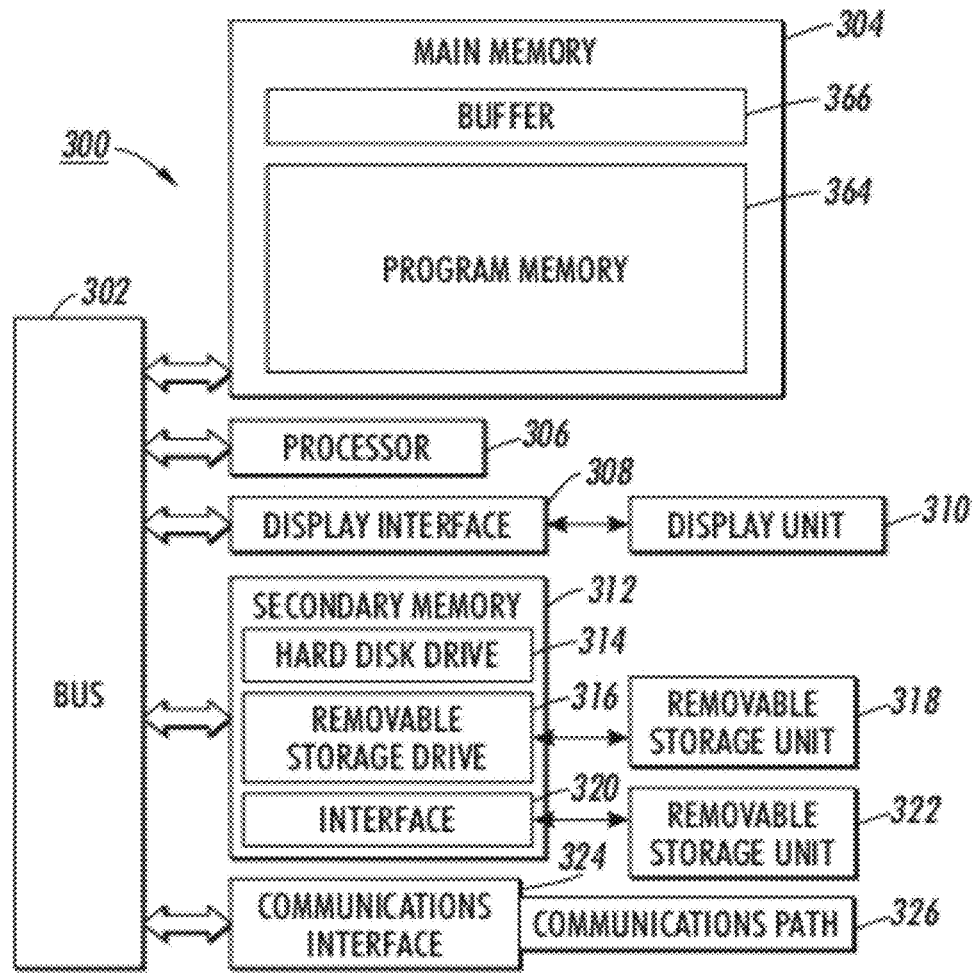
FIG. 3 is a block diagram of one embodiment of a computer system useful for implementing the present method for neutral pixel detection illustrated in the flow diagram of FIG. 1.

Reference is now being made the system of FIG. 3 illustrating a block diagram of one embodiment of a computer system useful for implementing the present method for neutral pixel detection illustrated in the flow diagram of FIG. 1.

The computer system 300 can be a xerographic system, a photocopier, or printing device. The computer system includes one or more processors, such as processor 306 capable of executing machine executable program instructions. In the embodiment shown, the processor is in communication with bus 302 (e.g., a backplane interface bus, crossover bar, or data network). The computer system also includes a main memory 304 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 366 to temporarily store data for access by the processor, and a program memory 364 that includes, for example, executable programs that implement the methods described herein. The program memory is capable of storing a subset of the data that is less than all of the data contained in the buffer.

Computer system 300 includes a display interface 308 that forwards data from communication bus 302 (or from a frame buffer not shown) to display 310. The computer system also includes a secondary memory 312. The secondary memory may include, for example, a hard disk drive 314 and/or a removable storage drive 316 which reads and writes to removable storage unit 318, such as a floppy disk, magnetic tape, optical disk, etc., that stores computer software and/or data.

In an alternative embodiment, the secondary memory 312 includes other similar mechanisms for allowing computer programs or other instructions to be loaded into the computer system. Such mechanisms may include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable storage units and interfaces 320 which allow software and data to be transferred from the removable storage unit to the computer system.

The computer system 300 includes a communications interface 324 which acts as both an input and an output to allow software and data to be transferred between the computer system and external devices. Examples of a communications interface include a modem, a network interface (such as an Ethernet card), a communications port, a PCMCIA slot and card, etc..

Software and data transferred via the communications interface are in the form of signals which may be, for example, electronic, electromagnetic, optical, or other signals capable of being received by communications interface 324. These signals are provided to communications interface via a communications path 326 (i.e., channel) which carries signals and may be implemented using wire, cable, fiber optic, phone line, cellular link, RF, or other communications channels.

Terms such as, computer program medium, computer executable medium, computer usable medium, and computer readable medium, are used herein to generally refer to media such as main memory 304 and secondary memory 312, removable storage drive 316, a hard disk installed in hard disk drive 314, and signals. These computer program products are means for providing instructions and/or data to the computer system. The computer readable medium stores data, instructions, messages packets, or other machine readable information. The computer readable medium, for example, may include non-volatile memory, such as a floppy, ROM, flash memory, disk memory, CD-ROM, and other permanent storage useful, for example, for transporting information, such as data and computer instructions. Furthermore, the computer readable medium may comprise computer readable information in a transitory state medium such as a network link and/or a network interface, including a wired network or a wireless network, which allows a computer to read such computer readable information. Computer programs (also called computer control logic) may be stored in main memory and/or secondary memory. Computer programs may also be received via a communications interface. Such computer programs, when executed, enable the computer system to perform the features and capabilities provided herein. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

Furthermore, the flow diagrams hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

It should also be understood that the teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a printer, a photocopier, a driver, a scanner, a photographic system, a xerographic device, or the like. The methods provided herein can also be implemented by physical incorporation into an image processing, image reproduction, or color management system.

One or more aspects of the methods described herein are intended to be incorporated in an article of manufacture, including one or more computer program products, having computer usable or machine readable media. For purposes hereof, a computer usable or machine readable media is, for example, a floppy disk, a hard- drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described herein. Additionally, the article of manufacture may be included as part of a xerographic system, an operating system, a plug-in, or may be shipped, sold, leased, or otherwise provided separately either alone or as part of an add-on, update, upgrade, or product suite.

It will be appreciated that the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention.

What is claimed is:

1. A computer implemented method for neutral pixel determination in an image path, the method comprising:
   scanning an image into memory to obtain a plurality of pixels;
   identifying a current pixel of interest in a 5×3 window of a neighborhood of pixels around said current pixel, said 5×3 window being 3 scanlines by a 5 pixel detection window comprising a total of 15 pixels, each of said pixels having a respective luminance L* and chroma a* and b* determined from 3 color planes;

determining an amount of luminance variation using said current pixel and 4 pixels immediately surrounding said current pixel;

determining an amount of chrominance adjustment (currC_Adj) based upon said amount of luminance variation;

determining an amount of chroma adjusted luminance chroma Adj L);

determining a new chrominance for said current pixel, said new chrominance (currC New) comprising:

$$currC\_New = \max(0, (\max(\min C, (currC-currC\_Adj)) - chroma\_Adj\_L)),$$

where currC is a chroma of said current pixel and minC is a minimum chrominance of said current pixel and 4 pixels immediately surrounding said current pixel; and using at least said new chrominance value to determine a neutral pixel detection tag for said current pixel.

2. The method of claim 1, wherein said amount of luminance variation (deltaL) comprises:

$$deltaL = maxL - minL,$$

where minL and maxL are minimum and maximum L* of said current pixel and of 4 pixels immediately surrounding said current pixel.

3. The method of claim 2, wherein determining said chrominance adjustment comprises:

if (deltaL<e0) then curri C Adj=currC_adj0;

else if (deltaL≧e0 AND deltaL<e1) then currC Adj=currC_adj1;

else if (deltaL≧e1 AND deltaL<e2) then currC Adj=currC_adj2;

else currC Adj=currC_adj3, where e0, e1, e2 are programmable values of the format unsigned 8 bit, and currC_adj0, currC_adj1, currC_adj2, and currC_adj3 are programmable values of the format signed 5 bit.

4. The method of claim 1, wherein said chroma adjusted luminance comprises:

$$chroma\,Adj\_L = chroma\_adj\_MinL\_Table[minL/4] + chroma\_adj\_MaxL\_Table[maxL/4],$$

where minL and maxL are minimum and maximum luminance values of said current pixel and of 4 pixels immediately surrounding said current pixel, and where chroma_adj_MinL_Table and chroma_adj_MaxL_Table are tables of 64 entries of the format unsigned 4 bit, said luminance values being right shifted by 2 bits to have the range of 0 to 63.

5. The method of claim 1, further comprising determining an amount of chrominance variation (deltaC) comprising:

$$deltaC = maxC - minC,$$

where minC and maxC are a minimum and maximum chroma, respectively, of said current pixel and of 4 pixels immediately surrounding said current pixel.

6. The method of claim 5, wherein said neutral pixel detection tag (pixC) for said current pixel comprises:

$$pixC = \min(currC\_New, avgC\_New),$$

wherein avgC_New is a new average chroma determined for said current pixel comprising:

$$avgC\_New = \max(0, (avgC - avgC\_Adj - chroma\_Adj\_L)),$$

wherein avgC is an average chroma approximated by:

$$avgC = (sumOf15 <<4 + sumOf15 + 128) >>8,$$

where sumOf15 is a sum of chrominance values of all pixels in said 5×3 window, the notation <<4 means shifted 4 bits to the left, and the notation >>8 means shifted 8 bits to the right, wherein avgC Adj comprises:

if (deltaC>7) then avgC_Adj=0;

else avgC Adj=Table[deltaC], where Table contains chroma adjustment values for each variation in chrominance and is indexed by said amount of chrominance variation.

7. The method of claim 5, wherein said neutral pixel detection tag (pixC) for said current pixel comprises:

$$pixC = \min(currC\_New, avgC\_New),$$

wherein avgC_New is a new average chroma determined for said current pixel comprising:

$$avgC\_New = \max(0, (avgC - avgC\_Adj - chroma\_Adj\_L)),$$

wherein avgC is an average chroma approximated by:

$$avgC = \max((7*\max(|Avga-offsetA|, |Avgb-offsetB|) + 4*\min(|Avga-offsetA|, |Avgb-offsetB|)) >>3, \max(|Avga-offsetA|, |Avgb-offsetB|)) + chromaZero,$$

where Avga is the average a* of all pixels in the window, Avgb is the average b* of all pixels in the window, and offsetA and offsetB are programmable offsets, and the mathematical notation >>3 means shifted 3 bits to the right, and where chromaZero is a variable, and wherein avgC Adj comprises:

if (deltaC>7) then avgC Adj=0;

else avgC Adj=Table[deltaC], where Table contains chroma adjustment values for each variation in chrominance and is indexed by said amount of chrominance variation.

8. A system for neutral pixel determination in an image path, the system comprising:

a memory; and a processor in communication with said memory, said processor executing a machine readable instruction for performing:

scanning an image into said memory to obtain a plurality of pixels;

identifying a current pixel of interest in a 5×3 window of a neighborhood of pixels around said current pixel, said 5×3 window being 3 scanlines by a 5 pixel detection window comprising a total of 15 pixels, each of said pixels having a respective luminance L* and chroma a* and b* determined from 3 color planes;

determining an amount of luminance variation using said current pixel and 4 pixels immediately surrounding said current pixel;

determining an amount of chrominance adjustment (currC_Adj) based upon said amount of luminance variation;

determining an amount of chroma adjusted luminance chroma Adj L);

determining a new chrominance for said current pixel, said new chrominance (currC New) comprising:

currC_New=max(0, (max(minC, (currC−currC_Adj))−chroma_Adj_L)), where currC is a chroma of said current pixel and minC is a minimum chrominance of said current pixel and 4 pixels immediately surrounding said current pixel; and using at least said new chrominance value to determine a neutral pixel detection tag for said current pixel.

9. The system of claim 8, wherein said amount of luminance variation (deltaL) comprises:

deltaL=maxL−minL, where minL and maxL are minimum and maximum L* of said current pixel and of 4 pixels immediately surrounding said current pixel.

10. The system of Claim 9, wherein determining said chrominance adjustment comprises:

if (deltaL<e0) then currC Adj=currC_adj0;

else if (deltaL≧e0 AND deltaL<e1) then currC Adj=currC_adj1;

else if (deltaL≧e1 AND deltaL<e2) then currC Adj=currC_adj2;

else currC Adj=currC_adj3, where e0, e1, e2 are programmable values of the format unsigned 8 bit, and currC_adj0, currC_adj1, currC_adj2, and currC_adj3 are programmable values of the format signed 5 bit.

11. The system of claim 8, wherein said chroma adjusted luminance comprises:

chroma Adj L=chroma_adj_MinL_Table[minL/4]+chroma_adj_MaxL_Table[maxL/4], where minL and maxL are minimum and maximum luminance values of said current pixel and of 4 pixels immediately surrounding said current pixel, and where chroma_adj_MinL_Table and chroma_adj_MaxL_Table are tables of 64 entries of the format unsigned 4 bit, said luminance values being right shifted by 2 bits to have the range of 0 to 63.

12. The system of claim 8, further comprising determining an amount of chrominance variation (deltaC) comprising:

deltaC=maxC−minC, where minC and maxC are a minimum and maximum chroma, respectively, of said current pixel and of 4 pixels immediately surrounding said current pixel.

13. The system of claim 12, wherein said neutral pixel detection tag (pixC) for said current pixel comprises:

pixC=min(currC_New, avgC_New), wherein avgC_New is a new average chroma determined for said current pixel comprising:

avgC_New=max(0,(avgC−avgC_Adj−chroma_Adj_L)), wherein avgC is an average chroma approximated by:

avgC=(sumOf15<<4+sumOf15+128)>>8, where sumOf15 is a sum of chrominance values of all pixels in said 5×3 window, the notation <<4 means shifted 4 bits to the left, and the notation >>8 means shifted 8 bits to the right, and wherein avgC Adj comprises:

if (deltaC>7) then avgC Adj=0;

else avgC Adj=Table[deltaC], where Table contains chroma adjustment values for each variation in chrominance and is indexed by said amount of chrominance variation.

14. The system of claim 12, wherein said neutral pixel detection tag (pixC) for said current pixel comprises:

pixC=min(currC_New, avgC_New), wherein avgC_New is a new average chroma determined for said current pixel comprising:

avgC_New=max(0,(avgC−avgC_Adj−chroma_Adj_L)), wherein avgC is an average chroma approximated by:

avgC=max((7*max(|Avga−offsetA|, |Avgb−offsetB|)+4*min(|Avga−offsetA|, |Avgb−offsetB|))>>3, max(|avga−offsetA|, Avgb−offsetB|))+chroma-Zero, where Avga is the average a* of all pixels in the window, Avgb is the average b* of all pixels in the window, and offsetA and offsetB are programmable offsets, and the mathematical notation >>3 means shifted 3 bits to the right, and where chromaZero is a variable, and wherein avgC Adj comprises:

if (deltaC>7) then avgC Adj=0;

else avgC Adj=Table[deltaC], where Table contains chroma adjustment values for each variation in chrominance and is indexed by said amount of chrominance variation.

15. A computer program product for neutral pixel determination in an image path, the computer program product comprising:

a non-transitory computer readable media for storing instructions that, when executed on a computer, cause the computer to perform a computer-implemented method comprising:

scanning an image into memory to obtain a plurality of pixels;

identifying a current pixel of interest in a 5×3 window of a neighborhood of pixels around said current pixel, said 5×3 window being 3 scanlines by a 5 pixel detection window comprising a total of 15 pixels, each of said pixels having a respective luminance L* and chroma a* and b* determined from 3 color planes;

determining an amount of luminance variation using said current pixel and 4 pixels immediately surrounding said current pixel;

determining an amount of chrominance adjustment (currC_Adj) based upon said amount of luminance variation;

determining an amount of chroma adjusted luminance chroma Adj L);

determining a new chrominance for said current pixel, said new chrominance (currC New) comprising:

currC_New=max(0, (max(minC, (currC−currC_Adj))−chroma_Adj_L)), where currC is a chroma of said current pixel and minC is a minimum chrominance of said current pixel and 4 pixels immediately surrounding said current pixel; and using at least said new chrominance value to determine a neutral pixel detection tag for said current pixel.

16. The computer program product of claim 15, wherein said amount of luminance variation (deltaL) comprises:

deltaL=maxL−minL, where minL and maxL are minimum and maximum L* of said current pixel and of 4 pixels immediately surrounding said current pixel.

17. The computer program product of claim 16, wherein determining said chrominance adjustment comprises:

if (deltaL<e0) then currC Adj=currC_adj0;

else if (deltaL≧e0 AND deltaL<e1) then currC Adj=currC_adj1;

else if (deltaL≧e1 AND deltaL<e2) then currC Adj=currC_adj2;

else currC Adj=currC_adj3, where e0, e1, e2 are programmable values of the format unsigned 8 bit, and currC_adj0, currC_adj1, currC_adj2, and currC_adj3 are programmable values of the format signed 5 bit.

18. The computer program product of claim 15, wherein said chroma adjusted luminance comprises:

chroma Adj L=chroma_adj_MinL_Table[minL/4]+ chroma_adj_MaxL_Table[maxL/4], where minL and maxL are minimum and maximum luminance values of said current pixel and of 4 pixels immediately surrounding said current pixel, and where chroma_adj_MinL_Table and chroma_adj_MaxL_Table are tables of 64 entries of the format unsigned 4 bit, said luminance values being right shifted by 2 bits to have the range of 0 to 63.

19. The computer program product of claim 15, determining an amount of chrominance variation (deltaC) comprising:

deltaC=maxC−minC, where minC and maxC are a minimum and maximum chroma, respectively, of said current pixel and of 4 pixels immediately surrounding said current pixel.

20. The computer program product of claim 19, wherein said neutral pixel detection tag (pixC) for said current pixel comprises:

pixC=min(currC_New, avgC_New), wherein avgC_New is a new average chroma determined for said current pixel comprising:

avgC_New=max(0,(avgC−avgC_Adj−chroma_Adj_L)), wherein avgC is an average chroma approximated by:

avgC=(sumOf15<<4+sumOf15+128)>>8, where sumOf15 is a sum of chrominance values of all pixels in said 5×3 window, the notation <<4 means shifted 4 bits to the left, and the notation >>8 means shifted 8 bits to the right, and wherein avgC Adj comprises:

if (deltaC>7) then avgC Adj=0;

else avgC Adj=Table[deltaC], where Table contains chroma adjustment values for each variation in chrominance and is indexed by said amount of chrominance variation.

21. The computer program product of claim 19, wherein said neutral pixel detection tag (pixC) for said current pixel comprises:

pixC=min(currC_New, avgC_New), wherein avgC_New is a new average chroma determined for said current pixel comprising:

avgC_New=max(0,(avgC−avgC_Adj−chroma_Adj_L)), wherein avgC is an average chroma approximated by:

avgC=max((7*max(|Avga−offsetA|, |Avgb−offsetB|)+ 4*min(|Avga−offsetA|, |Avgb−offsetB|))>>3, max(|Avga−offsetA|, |Avgb−offsetB|))+chromaZero, where Avga is the average a* of all pixels in the window, Avgb is the average b* of all pixels in the window, and offsetA and offsetB are programmable offsets, and the mathematical notation >>3 means shifted 3 bits to the right, and where chromaZero is a variable, and wherein avgC Adj comprises:

if (deltaC>7) then avgC Adj=0;

else avgC Adj=Table[deltaC], where Table contains chroma adjustment values for each variation in chrominance and is indexed by said amount of chrominance variation.

\* \* \* \* \*